(12) United States Patent
Hue et al.

(10) Patent No.: US 9,458,794 B2
(45) Date of Patent: Oct. 4, 2016

(54) TERTIARY LOCKING ASSEMBLY FOR A THRUST REVERSER

(71) Applicant: AIRCELLE, Gonfreville l'Orcher (FR)

(72) Inventors: Corentin Hue, Le Havre (FR); Mathieu Lerouvreur, Le Havre (FR)

(73) Assignee: AIRCELLE, Gonfreville l'Orcher ( * ) Notice: Subject to any disclaimer, the term of this patent is extended or adjusted under 35 U.S.C. 154(b) by 561 days.

(21) Appl. No.: 14/060,823

(22) Filed: Oct. 23, 2013

(65) Prior Publication Data

US 2014/0076999 A1 Mar. 20, 2014

Related U.S. Application Data

(63) Continuation of application No. PCT/FR2012/050870, filed on Apr. 20, 2012.

(30) Foreign Application Priority Data

Apr. 27, 2011 (FR) ...................................... 11 53583

(51) Int. Cl.
| | |
|---|---|
| *F02K 1/76* | (2006.01) |
| *F01D 5/00* | (2006.01) |
| *H01H 50/32* | (2006.01) |
| *H01H 3/40* | (2006.01) |
| *H01H 3/42* | (2006.01) |

(52) U.S. Cl.
CPC ............... *F02K 1/766* (2013.01); *F01D 5/005* (2013.01); *H01H 50/326* (2013.01); *F05D 2230/80* (2013.01); *F05D 2240/14* (2013.01); *F05D 2270/52* (2013.01); *F05D 2270/62* (2013.01); *H01H 3/40* (2013.01); *H01H 3/42* (2013.01)

(58) Field of Classification Search
CPC .... F02K 1/766; F01D 5/005; F05D 2230/72; F05D 2230/80; F05D 2270/52; F05D 2270/62
See application file for complete search history.

(56) References Cited

U.S. PATENT DOCUMENTS 7,278,257 B2 * 10/2007 Colotte ................... F02K 1/766
239/265.33
7,409,820 B2 * 8/2008 Ahrendt ..................... F02K 1/72
244/110 B (Continued)

FOREIGN PATENT DOCUMENTS

| | | |
|---|---|---|
| DE | 19717236 A1 | 10/1998 |
| FR | 2916426 A1 | 11/2008 |
| FR | 2927309 A1 | 8/2009 |
| FR | 2927310 A1 | 8/2009 |
| GB | 2145566 A | 3/1985 |
| WO | 01/57382 A2 | 8/2001 |
| WO | 2004/022963 A1 | 3/2004 |

OTHER PUBLICATIONS

International Search Report issued May 20, 2013 in International Application No. PCT/FR2012/050870.

*Primary Examiner* — Arun Goyal
(74) *Attorney, Agent, or Firm* — Burris Law, PLLC

(57) ABSTRACT

A tertiary locking assembly for a thrust reverser includes a tertiary lock, a primary control line associated with the tertiary lock, and a secondary control line. The primary control line includes a primary electromechanical valve and a primary power supply line connected to the primary electromechanical valve. In addition, the secondary control line has a secondary electromechanical control valve and a secondary power supply line connected to the secondary electromechanical control valve. In particular, the secondary control line is provided with at least one manually controlled switch.

13 Claims, 3 Drawing Sheets

(56) References Cited

U.S. PATENT DOCUMENTS

| | | | | |
|---|---|---|---|---|
| 8,628,128 B2* | 1/2014 | Sternberger | ............ | B64C 13/00 292/302 |
| 8,892,295 B2* | 11/2014 | Zaccaria | ................. | F02K 1/763 60/226.2 |
| 2006/0042229 A1 | 3/2006 | Hanlon et al. | | |
| 2006/0070862 A1 | 4/2006 | Dumont | | |
| 2006/0101806 A1 | 5/2006 | Ahrendt | | |
| 2007/0290642 A1 | 12/2007 | Shimizu et al. | | |
| 2011/0094324 A1* | 4/2011 | Davies | .................... | F02K 1/763 74/25 |

* cited by examiner

TERTIARY LOCKING ASSEMBLY FOR A THRUST REVERSER

CROSS-REFERENCE TO RELATED APPLICATIONS

This application is a continuation of International Application No. PCT/FR2012/050870, filed on Apr. 20, 2012, which claims the benefit of FR 11/53583, filed on Apr. 27, 2011. The disclosures of the above applications are incorporated herein by reference.

FIELD

The present disclosure relates to a so-called tertiary locking assembly for a thrust reverser equipping a turbojet engine nacelle as well as a switch for such an assembly.

BACKGROUND

The statements in this section merely provide background information related to the present disclosure and may not constitute prior art.

An aircraft is moved by several turbojet engines each located in a nacelle also housing a set of related actuating devices connected to its operation and performing various functions when the turbojet engine is running or stopped. These related actuating devices in particular comprise a mechanical thrust reverser actuating system.

A nacelle generally has a tubular structure comprising an air intake upstream from the turbojet engine, a middle section intended to surround a fan of the turbojet engine, a downstream section housing thrust reverser means and intended to surround the combustion chamber of the turbojet engine, and generally ends with a jet nozzle, the outlet of which is situated downstream from the turbojet engine.

In the present application, the terms "upstream" and "downstream" are defined in reference to the flow direction of the flows of air.

Modern nacelles are intended to house a dual flow turbojet engine capable of creating, by means of the fan blades, a flow of air whereof one portion, called hot or primary flow, circulates in the combustion chamber of the turbojet engine, and whereof the other portion, called cold or secondary flow, circulates outside the turbojet engine through an annular passage, also called a tunnel, formed between a fairing of the turbojet engine forming an internal fixed structure (IFS) and an inner wall of an outer fixed structure (OFS) of the nacelle. The two flows of air are discharged from the turbojet engine through the rear of the nacelle.

During landing of an airplane, the role of a thrust reverser is to improve the braking capacity of that airplane by reorienting at least part of the secondary flow of air forward. In this phase, the reverser obstructs the cold flow tunnel and orients said cold flow toward the front of the nacelle, thereby creating a counter-thrust that is added to the braking of the airplane's wheels.

The means implemented to perform this reorientation of the cold flow vary depending on the type of reverser. However, in all cases, the structure of a reverser comprises moving cowls that can be moved between a closed or "direct jet" position, in which they close that passage, and an open or "reverse jet" position, in which they open a passage in the nacelle intended for the deflected flow. These cowls may perform a deviating function or simply serve to activate other deviating means.

In the case of a cascade thrust reverser, the reorientation of the flow of air is done by cascade vanes, the cowl performing only a simple sliding function aiming to expose or cover said vanes.

The translation of the moving cowl is done along a longitudinal axis substantially parallel to the axis of the nacelle. Thrust reverser flaps, actuated by the sliding of the cowl, make it possible to obstruct the tunnel of the cold flow downstream from the cascade vanes, so as to improve the reorientation of the cold flow toward the outside of the nacelle.

The sliding of the moving cowl between its "direct jet" and "reverse jet" positions is traditionally done by multiple actuators, of the electromechanical type (for example, a worm screw actuated by an electric motor and moving a nut) or the hydraulic type (cylinders actuated by pressurized oil).

Known from the state of the art, and in particular from document FR 2,916,426, is a cascade thrust reverser whereof the cowl is in a single piece and slidingly mounted on runners positioned on either side of the suspension pylon of the assembly formed by the turbojet engine and its nacelle.

"Single-piece cowl" refers to a quasi-annular cowl, extending from one side of the pylon to the other without interruption.

Such a cowl is often referred to as an "O-duct", in reference to the shroud shape of such a cowl, as opposed to a "D-duct" or "C-duct", which comprises two substantially semi-cylindrical cowls each extending over a half-circumference of the nacelle.

The thrust reverser device is an integral part of this downstream part and generally follows the same O-duct or C-duct architecture.

Based on the structure of the downstream section, the maneuvering operations to access the inside of the nacelle during maintenance operations are different.

Thus, in the case of a traditional C-duct nacelle, the moving cowls are generally mounted so as to be able to be opened by pivoting around a substantially longitudinal axis of the nacelle situated near the attachment pylon of said nacelle. During maintenance operations, it therefore suffices to unlock these moving cowls along a hinge line generally separated in the lower part of the nacelle and to open said moving cowls (butterfly opening).

The same cannot be true for an O-duct nacelle. In such a configuration, the moving cowl must be maneuvered in the longitudinal axis of the nacelle, toward the rear thereof, substantially along the same path as during opening of the cowl in thrust reverser mode.

It should nevertheless be noted that for safety reasons, in particular in order to avoid any untimely opening of the thrust reverser during flight, lock systems are provided equipping the device and aiming to block unauthorized movement of the moving cowl(s).

There are generally three locks of two types per moving cowl. More specifically, there are two so-called primary locks, positioned upstream from the cowl, generally at cylinders driving the latter, so as to lock the actuators of the cowl themselves, and a so-called tertiary lock, positioned downstream from the thrust reverser device generally at a guide rail of the moving cowl in question, so as to be able to block the cowl directly itself. This tertiary lock frequently assumes the form of a locking hook capable of engaging with a shaft secured to said cowl, so as to block the withdrawal thereof along said rail.

These locks are powered by the electrical grid of the airplane and connected to the control system of the thrust reverser. Thus, on the ground, these locks are in the locked position and are generally no longer electrically maneuverable from the airplane.

One example of a tertiary lock is described in document US 2006/0101806.

It will therefore be understood that a so-called tertiary lock is thus capable of preventing opening of the moving cowl for maintenance operations in the case of an O-duct nacelle, whereas it is does not present any hindrance for a C-duct nacelle.

The disengagement of the tertiary bolt during maintenance may either be done electrically, using the same principle as its nominal control from the airplane, or manually.

In order to reduce the time needed to access the engine, electrical control is preferable. Such a choice, however, involves several constraints, i.e., in particular:

the electrical power supply and electrical maintenance command need to come from the electrical power supply grid and a control grid that are generally dedicated to maintenance, and in any case segregated from the nominal electricity and control grids of the airplane, opening is able to be commanded by an operator at the nacelle, the command is used only for the time needed to translate the moving cowl, so as to avoid any overheating of the electrical opening device of the lock, and in particular the motor, the opening of the lock need be quick enough and any impact of the translated moving cowl on the lock must be avoided.

Furthermore, in the case of a manual system, the ease of maneuvering of course depends on the accessibility of said lock. It is in particular increasingly frequent for the tertiary lock to be positioned near the pylon, close to a so-called 12 o'clock beam serving as a guide rail or runner most capable of reacting forces optimally. Under such conditions, it is then hard to access said lock manually and without a ladder.

In the case of C-duct nacelles for example, the tertiary locks are placed substantially at 6 o'clock, and more specifically at a middle actuator of the concerned cowl, and are therefore easily manually accessible, in particular to inhibit them if necessary.

In general, the existing solutions for C-duct nacelles cannot be transposed to O-duct nacelles, due both to the different accessibility and the maneuvering needs.

In fact, as previously mentioned in the case of C-duct nacelles, the tertiary locks do not need to be open to allow opening of the moving cowls. As a result, the need to operate the tertiary lock manually is rare, the potential bother furthermore being reduced due to the location of the tertiary locks at 6 o'clock.

Thus, the current solutions available for an O-duct nacelle having a tertiary lock situated near the pylon only meet inhibiting needs, upon failure of that lock.

SUMMARY

The present disclosure provides a so-called tertiary locking assembly for a thrust reverser with which a turbojet engine nacelle is provided, said locking assembly including at least one so-called tertiary lock associated with at least one primary control line comprising at least one electromechanical control means on the one hand, as well as a power supply connected to said electromechanical control means on the other hand, characterized in that the locking assembly includes at least one secondary control line, said secondary control line comprising at least one electromechanical control means on the one hand, as well as a power supply which is connected to the electromechanical control means and which is separate from the electrical power supply of the primary control line on the other hand, said secondary control line being further provided with at least one manually controlled switch.

Thus, by providing an autonomous control line, the maintenance means have a segregated power supply line, distinct from the electrical grid of the airplane, and providing all safety guarantees relative both to the nominal operating mode and the maintenance operating mode.

In another form, the secondary control line comprises at least one electronic switch receiving activation information for the secondary control line. Thus, the secondary power supply line requires several conditions to be activated and supply power to the control means of the tertiary lock. Aside from the manual switch, it may be requested for an activation signal of the maintenance mode to be sent by the airplane, so as to close the electronic switch and allow the passage of current. This information may be sent automatically by the aircraft, in particular by closing the flight controls, for example, which automatically activates maintenance mode; activating the flight controls reciprocally automatically deactivates the maintenance mode.

Advantageously, the secondary power supply line comes from an electrical power supply line dedicated to maintenance. This further increases the safety of the system.

According to one preferred form, the electromechanical actuating means are of the solenoid type. In general, known technology for a tertiary lock assumes the form of locking means, for example of the locking finger or shear pin type, kept in an engaged position by default. The unlocking is done by supplying electricity, for the required time, to a solenoid attracting and keeping the locking means in its withdrawn and disengaged position. In one form, when the electrical power supply is cut, the locking means returns by default to the engaged position. It may of course also act on the other actuating means, for example motors.

According to a first alternative form, the electromechanical actuating means are shared by the primary and secondary control lines.

According to a second alternative form, the electromechanical actuating means are distinct between the primary and secondary control lines. This form will generally be preferred inasmuch as it guarantees increased security, all of the primary and secondary control lines being segregated.

Advantageously, the tertiary lock is equipped with at least one manual control means. Thus, the usual manual opening mode is preserved.

The present disclosure also relates to a manually controlled switch for a locking assembly according to the present disclosure, said switch comprising a rotatable drive square designed to receive driving means and transmit movement to at least one drive shaft, said drive square being associated with at least one translatable element positioned such that, on the one hand, when a tool is inserted into the drive square, said moving element is pushed toward an engaged position in which it makes it possible to reestablish the electrical continuity of the control line, and on the other hand, when the tool is removed from the drive square, the moving element is in a disengaged position in which the electrical continuity of the power supply line is broken.

Thus, owing to such a switch, the electrical power supply allowing unlocking of the tertiary lock is associated with mechanical drive means for opening the downstream O-duct section. One thus ensures that the control of the tertiary lock is only used during the maneuvering time, thereby avoiding any overheating of the electromechanical means of said tertiary lock. The tools inserted into the drive square will traditionally be of the electrical or pneumatic drilling type. The movement of the drill is transmitted by the drive square to a set of shafts that make it possible to maneuver the thrust reverser. The drive shaft maybe of the flexshaft type.

Advantageously, the moving element is mounted against at least one elastic return means tending to return it to its disengaged position. Thus, the removal of the driving tool also cuts the electrical power supply.

In one form, the moving element is positioned at least partially inside the drive square, inside which it slides during the insertion of the drive means.

Advantageously, the translatable element is associated with at least one cam.

In still another form, the switch comprises at least one toggle, comprising a plunger intended to be actuated directly or indirectly by the translatable element.

The present disclosure further relates to a thrust reverser for a turbojet engine nacelle, characterized in that it is equipped with at least one locking assembly according to the present disclosure. Advantageously, said thrust reverser can be maneuvered during maintenance operations and comprises a switch according to the present disclosure.

The present disclosure lastly relates to a turbojet engine nacelle, characterized in that it comprises at least one thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagrammatic illustration of an assembly according to the present disclosure; and FIGS. 2 and 3 are diagrammatic illustrations of switches equipping the assembly of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a so-called tertiary locking assembly for a thrust reverser comprises a tertiary lock 1, associated with a primary control line 2.

This control line 2 comprises a primary solenoid 3, constituting electromechanical control means for the tertiary lock 1. Of course, based on the type of tertiary lock 1, other electromechanical control means are possible and the present disclosure is not limited thereto.

This primary solenoid 3 is powered by a primary electrical power supply line 4 coming from a junction box 100 between the turbojet engine nacelle and a pylon to which it is attached. The power supply comes from the airplane's electricity grid.

During normal operation, during maneuvering of the thrust reverser, an airplane command activates the electrical power supply line 4 of the primary solenoid 3, which makes it possible to drive the tertiary lock 1 toward its withdrawn position, then allowing maneuvering of the device as previously explained. When idle, the primary solenoid 3 is not supplied with electricity, and the tertiary lock 1 is in its engaged position in which it blocks any maneuver of the thrust reverser.

Thus, during maintenance operations, the airplane's electrical grid being cut, it is normally not possible to operate the tertiary lock 1 electrically. It must therefore be maneuvered manually.

This poses difficulties, several of which were mentioned above.

According to the present disclosure, the possibility is provided of actuating the tertiary lock 1 electrically during maintenance operations, while respecting aeronautic security criteria.

To that end, the tertiary locking assembly is equipped with a secondary control line 20, dedicated to maintenance, and comprising a secondary solenoid 30, or other electromechanical control means, associated with the primary lock 1.

The secondary solenoid 30 is supplied by a secondary electrical power supply line 40 distinct from the primary power supply line 4.

This secondary power supply line 40 also comes from the junction box 100 with the pylon and is preferably powered by an electricity grid of the airplane dedicated to maintenance, in particular an electricity grid that is activated in opposition with the normal electrical grid of the airplane.

For security and maneuvering purposes, the secondary power supply line 40 of the secondary control line 20 is equipped with a manually controlled switch 50.

Furthermore, the secondary power supply line 40 of the secondary control line 20 is also equipped with an electronic switch 60 controlled by a control line 70, signaling whether the "maintenance" mode of the airplane is engaged.

Thus, the secondary solenoid 30 can only be activated if, on the one hand, the manual switch 50 is engaged, and on the other hand, a "maintenance" mode of the airplane is activated ("maintenance" power supply and "maintenance" status) activating the electronic switch 60.

Additionally, it is of course possible to keep the typical manual opening and closing means of the tertiary lock 1.

FIG. 2 shows a first form of a switch 510 according to the present disclosure.

Figure 1:
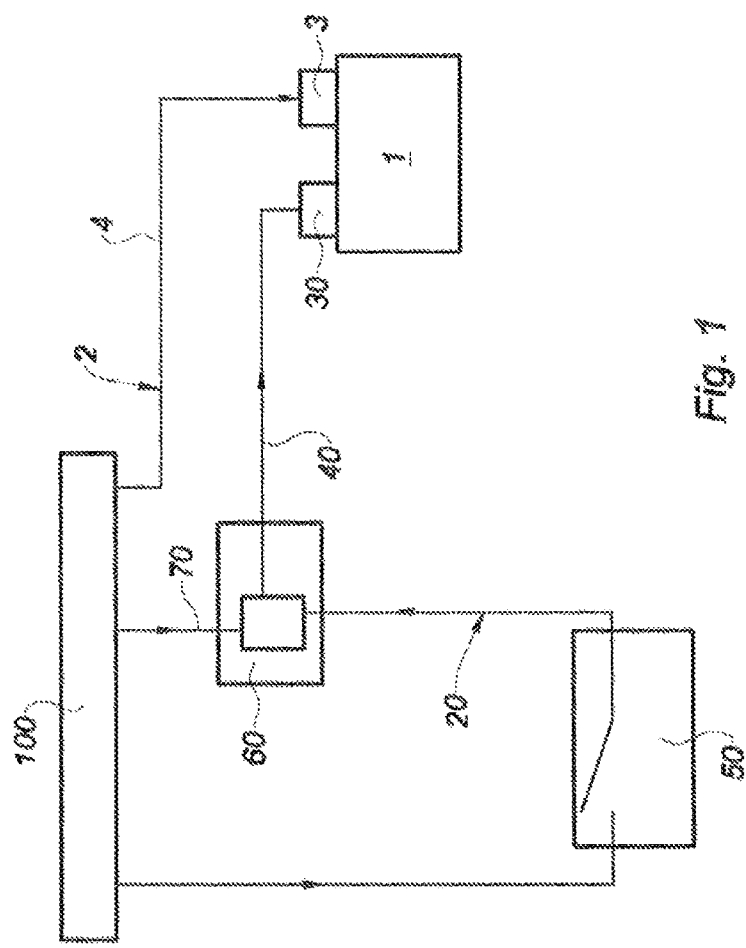
Figure 2:
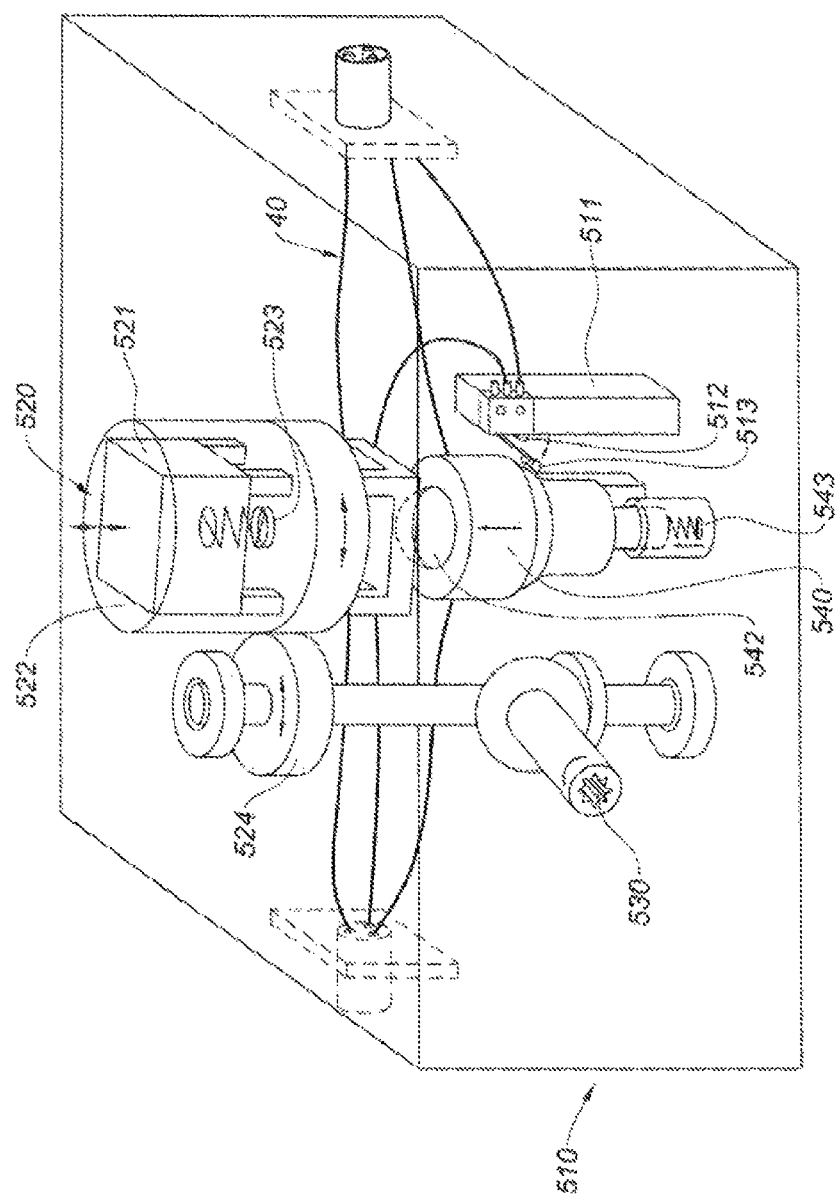
FIGS. 2 and 3 show examples of manually controlled switches 510, 570. The illustrated switches are also coupled with mechanical driving means for maneuvering the thrust reverser.

The switch 510 is situated on the secondary power supply line 40 and comprises a toggle 511 equipped with a plunger 512.

The plunger 512 of the toggle 511 can be switched using a mechanical assembly that will now be described.

The system assembly is housed in a housing bearing a mechanical input interface (drive square 520) and a mechanical output interface 530 intended to return the driving movement toward the mechanical driving means of the thrust reverser. These will in particular be flexible shafts commonly referred to as "flexshafts".

The drive square 520 comprises two parts. A first, inner square 521 is slidingly mounted so as to be pushed in when a tool with the dimensions of a second, outer square 522 is inserted.

A spring 523 tends to push it back into the extended position (idle position), which aims to disengage the tool, when the operator no longer exerts any force on said tool.

The outer square 522 is the part rotated by the tool. It is directly connected to a pinion 524. This pinion 524 must transmit the movement to the output interface 530.

The inner square 521 is designed to trigger the switch 510 automatically when it is pushed in.

While lowering, the inner square 521 will push on a cam 540 that will press on a lever 513 of the toggle 511. This lever 513 will push in the plunger 512 and activate the switch of the toggle 511.

So as not to transmit the rotation of the square 522 to the cam 540 (which could deteriorate the lever 513 of the toggle 511), a system reacting rotation via a free element (ball 542, for example) is integrated into the cam 540. This element isolates the movement of the square 522 from the cam 540.

A spring 543 pushes the cam 540 back into the idle position, once the inner square 521 in turn returns to the idle position, which results in releasing the lever 513 of the toggle 511 and therefore releasing the plunger 512 of the toggle 511.

In order to make the system redundant, the cam 540 activates (or deactivates) two or more toggles in particular placed at 90° from one another.

Figure 3:
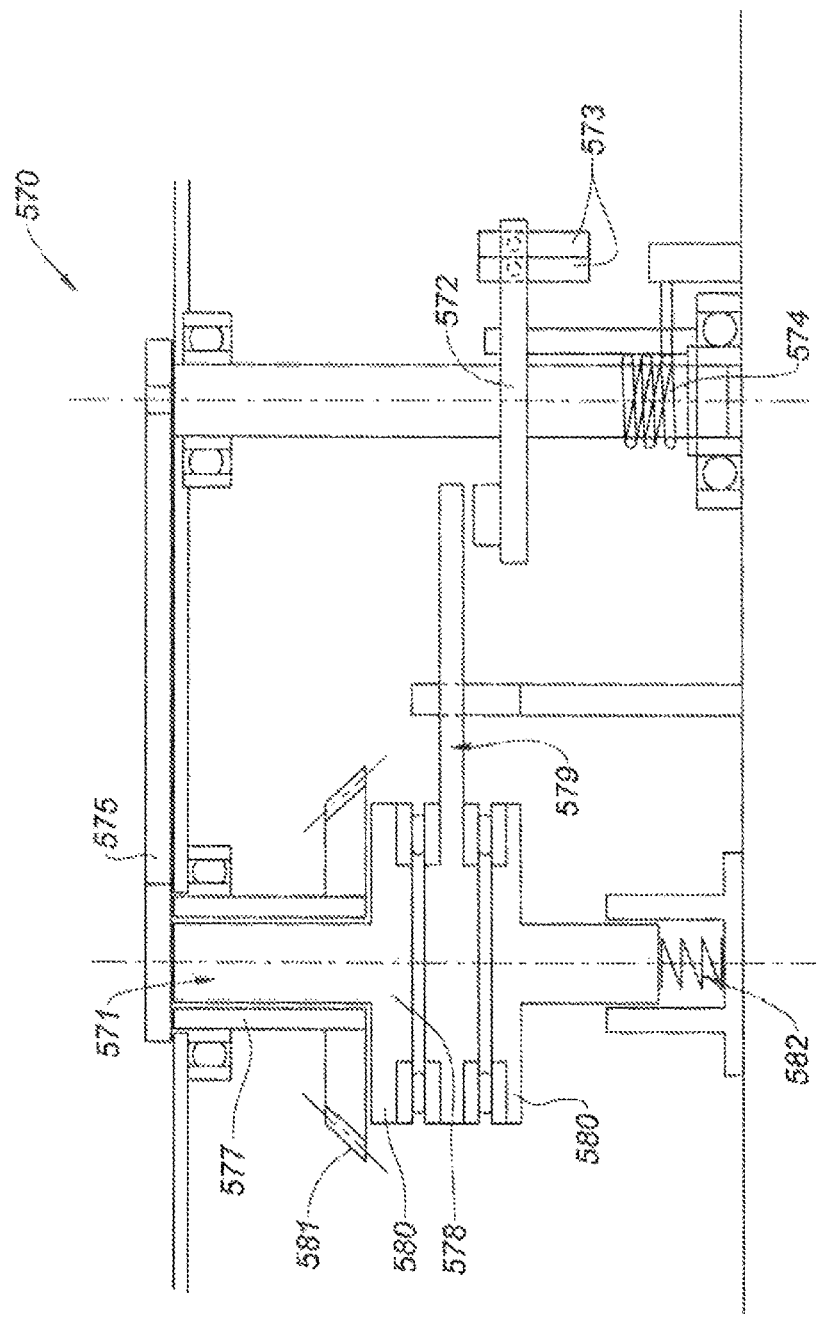

FIG. 3 shows a second form of a switch 570 according to the present disclosure.

The switch 570 comprises a rotary cowl 575 that protects a drive square 571 serving as a mechanical interface for rotating the drive means of the thrust reverser. This cowl 575 is connected by its axis of rotation to a cam 572 placed in the interface housing. The toggles 573 are placed across from this cam.

The rotation of the cam 575 to disengage the drive square 571 (to be able to insert a tool) drives the rotation by the same angle of the cam 572. Once the moving cam has traveled a certain distance, for example 9/10 of its total travel, and it still covers the drive square 571 enough to prevent the insertion of the tool, the cam 572 activates the toggles 573.

The rotary cowl 575 is automatically returned to the closed position when it is no longer maintained owing to a torsion spring 574. Thus, to be able to block the cowl 575 in the open position, a tool must be inserted into the drive square 571.

As before, the drive square 571 comprises an outer square 577 providing mechanical driving, and an inner square 578 that can be pushed in.

Inserting the tool into the outer square 577 forces the inner square 578 to be pushed in and drives the vertical movement of a blocking fork 579. This fork 579 positions itself across from a finger placed on the cam 572, preventing the rotation thereof and therefore the return to the closed position of the cowl 575.

The blocking fork 579 is isolated from the rotation of the square 571 owing to bearings 580.

An anti-rotation system of the blocking fork 579 will also be provided, so as to prevent the latter from performing any unauthorized rotation due to the combined effect of the rotation and the friction between components that may drive it.

The outer part of the square 577 is driven by the tool.

It is connected to a conical pinion 581 making it possible to transmit the force in another direction. The inner square 578 slides inside.

When the tool is withdrawn, the inner square 578 is returned to the initial position by a spring 582. This also results in raising the blocking fork 579 and therefore unblocking the rotation of the cam 572, driving the closure of the cowl 575.

Although the present disclosure has been described with one particular form, it is of course in no way limited thereto and comprises all technical equivalents of the described means, as well as combinations thereof if they are within the scope of the present disclosure.

What is claimed is:

1. A thrust reverser in a nacelle of a turbojet engine comprising a tertiary locking assembly, said tertiary locking assembly comprising:
    at least one tertiary lock;
    at least one primary control line associated with the at least one tertiary lock, the at least one primary control line comprising at least one primary electromechanical control means and a primary power supply line connected to said at least one primary electromechanical control means;
    and at least one secondary control line associated with the at least one tertiary lock, said at least one secondary control line comprising at least one secondary electromechanical control means and a secondary power supply line which is connected to the at least one secondary electromechanical control means and which is separate from the primary power supply line of the at least one primary control line,
    wherein said at least one secondary control line is provided with at least one manually controlled switch.

2. The tertiary locking assembly according to claim 1, wherein the at least one secondary control line comprises at least one electronic switch receiving activation information for the at least one secondary control line.

3. The tertiary locking assembly according to claim 1, wherein the at least one secondary power supply line comes from an electrical power supply line dedicated to maintenance.

4. The tertiary locking assembly according to claim 1, wherein the at least one primary electromechanical control means and the at least one secondary electromechanical control means are of a solenoid type.

5. The tertiary locking assembly according to claim 1, wherein the at least one primary electromechanical control means and the at least one secondary electromechanical control means are shared by the at least one primary control line and the at least one secondary control line.

6. The tertiary locking assembly according to claim 1, wherein the at least one primary electromechanical control means and the at least one secondary electromechanical control means are distinct between the at least one primary control line and the at least one secondary control line.

7. The tertiary locking assembly according to claim 1, wherein the at least one tertiary lock is equipped with at least one manual control means.

8. The tertiary locking assembly according to claim 1, wherein said at least one manually controlled switch comprising a rotatable drive square designed to receive driving means and transmit movement to at least one drive shaft, said drive square being associated with at least one translatable element positioned such that, on the one hand, when a tool is inserted into the drive square, said at least one translatable element is pushed toward an engaged position in which it makes it possible to reestablish an electrical continuity of the secondary control line, and on the other hand, when the tool is removed from the drive square, the at least one translatable element is in a disengaged position in which the electrical continuity of the secondary power supply line is broken.

9. The tertiary locking assembly according to claim 8, wherein the at least one translatable element is mounted against at least one elastic return means tending to return the at least one translatable element to said disengaged position.

10. The tertiary locking assembly according to claim 8, wherein the at least one translatable element is positioned at least partially inside the drive square, inside which the at least one translatable element slides during insertion of the driving means.

11. The tertiary locking assembly according to claim 8, wherein the at least one translatable element is associated with at least one cam.

12. The tertiary locking assembly according to claim 8, wherein the at least one manually controlled switch further comprises at least one toggle, comprising a plunger intended to be actuated directly or indirectly by the translatable element.

13. The thrust reverser according to claim 8, wherein said thrust reverser can be maneuvered during maintenance operations.

* * * * *